(12) United States Patent
Wells et al.

(10) Patent No.: US 7,350,083 B2
(45) Date of Patent: Mar. 25, 2008

(54) INTEGRATED CIRCUIT CHIP HAVING FIRMWARE AND HARDWARE SECURITY PRIMITIVE DEVICE(S)

(75) Inventors: Steven E. Wells, El Dorado Hills, CA (US); V. Niles Kynett, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1764 days.

(21) Appl. No.: 09/752,088

(22) Filed: Dec. 29, 2000

(65) Prior Publication Data

US 2002/0087872 A1    Jul. 4, 2002

(51) Int. Cl.
*H04L 9/32* (2006.01)
*H04L 9/00* (2006.01)

(52) U.S. Cl. .......................... 713/193; 380/46; 726/27
(58) Field of Classification Search ........ 713/192–194; 726/27, 34; 380/46
See application file for complete search history.

(56) References Cited

U.S. PATENT DOCUMENTS

| | | | |
|---|---|---|---|
| 3,790,768 A | 2/1974 | Chevalier et al. | |
| 4,525,599 A | 6/1985 | Curran et al. | |
| 4,562,306 A | 12/1985 | Chou et al. | |
| 4,578,649 A | 3/1986 | Shupe | |
| 4,694,412 A | 9/1987 | Domenik et al. | |
| 4,791,594 A | 12/1988 | Harney et al. | |
| 4,810,975 A | 3/1989 | Dias | |
| 4,855,690 A | 8/1989 | Dias | |
| 4,947,410 A | 8/1990 | Lippmann et al. | |
| 5,007,087 A | 4/1991 | Bernstein et al. | |
| 5,473,692 A | 12/1995 | Davis | |
| 5,539,828 A | 7/1996 | Davis | |
| 5,568,552 A | 10/1996 | Davis | |
| 5,570,307 A * | 10/1996 | Takahashi | 708/256 |
| 5,619,575 A * | 4/1997 | Koopman et al. | 380/28 |
| 5,627,775 A | 5/1997 | Hong et al. | |
| 5,706,218 A | 1/1998 | Hoffman | |
| 5,778,070 A | 7/1998 | Mattison | |
| 5,781,458 A | 7/1998 | Gilley | |
| 5,805,712 A | 9/1998 | Davis | |
| 5,828,753 A | 10/1998 | Davis | |
| 5,835,594 A | 11/1998 | Albrecht et al. | |

(Continued)

FOREIGN PATENT DOCUMENTS

DE    4006251 C1    4/1991

(Continued)

OTHER PUBLICATIONS

U.S. Appl. No. 09/283,098, filed Mar. 31, 1999, entitled Duty Cycle Corrector for a Random Number Generator, by Steven E. Wells and David A. Ward.

(Continued)

*Primary Examiner*—Hosuk Song
(74) *Attorney, Agent, or Firm*—Blakely, Sokoloff, Taylor & Zafman LLP

(57) ABSTRACT

An integrated circuit chip comprises firmware non-volatile memory to store firmware and at least one hardware security primitive device comprising non-volatile memory. The firmware non-volatile memory and the at least one hardware security primitive device are integrated on the integrated circuit chip.

24 Claims, 6 Drawing Sheets

U.S. PATENT DOCUMENTS

| | | | |
|---|---|---|---|
| 5,844,925 | A | 12/1998 | Dent |
| 5,844,986 | A | 12/1998 | Davis |
| 6,026,016 | A | 2/2000 | Gafken |
| 6,028,445 | A | 2/2000 | Lawman |
| 6,061,702 | A | 5/2000 | Hoffman |
| 6,084,935 | A | 7/2000 | Mather |
| 6,104,811 | A | 8/2000 | Aiello et al. |
| 6,195,433 | B1 | 2/2001 | Vanstone et al. |
| 6,209,098 | B1 | 3/2001 | Davis |
| 6,249,562 | B1 | 6/2001 | Wells |
| 6,986,053 | B1 * | 1/2006 | Schwartz et al. ........... 713/193 |

FOREIGN PATENT DOCUMENTS

| | | |
|---|---|---|
| WO | WO 00/59153 A2 | 10/2000 |
| WO | WO 00/59153 A3 | 1/2001 |
| WO | WO - 02/01368 A2 | 1/2002 |

OTHER PUBLICATIONS

U.S. Appl. No. 09/283,769, filed Mar. 31, 1999, entitled Programmable Random Bit Source, by Steven E. Wells.

U.S. Appl. No. 09/540,915, filed Mar. 31, 2000, entitled Secure Hardware Random Number Generator, by Steven E. Wells, V. Niles Kynett and Lance W. Dover.

U.S. Appl. No. 09/541,376, filed Mar. 31, 2000, entitled Random Number Generator With Entropy Accumulation, by Steven E. Wells and David A. Ward.

U.S. Appl. No. 09/339,012, filed Jun. 23, 1999, entitled Counter With Non-Uniform Digit Base, by Steven E. Wells.

U.S. Appl. No. 09/235,959, filed Jan. 22, 1999, entitled Preventing Unauthorized Updates to a Non-Volatile Memory, by Steven E. Wells.

U.S. Appl. No. 09/477,034, filed Dec. 31, 1999, entitled Non-Volatile Memory Based Monotonic Counter, by Lance W. Dover and Andrew H. Gafken.

Blum M., "Independent Unbiased Coin Flips from a Correlated Biased Source-A Finite State Markov Chain" Combinatorica, vol. 6, No. 2, pp. 97-108 (1986).

Chor, Benny, et al., "Unbiased Bits from Sources of Weak Randomness and Probabilistic Communication Complexity," SIAM Journal on Computing, vol. 17, No. 2, pp. 230-261 (Apr. 1988).

Fairfield, R.C., et al., "An LSI Random Number Generator (RNG)," published in Proceedings in Advances in Cryptology Conference on CRYPTO, pp. 203-215 (1984).

Gude, Michael, "Concept for a High Performance Random Number Generator Based on Physical Random Phenomena," Frequenz, 39, pp. 187-190 (Jul./Aug. 1985).

Murry, Herschell F., "A General Approach for Generating Natural Random Variables," IEEE Transactions on Computers, pp. 1210-1213 (Dec. 1970).

Santha, Miklos, et al., "Generating Quasi-Random Sequences from Slightly-Random Sources," Proceedings of the 25th Annual Symposium on Foundations of Computer Science, pp. 434-440 (Oct. 24-26, 1984).

Santha, Miklos, et al., "Generating Quasi-random Sequences from Semi-random Sources," Journal of Computer and System Sciences, Vol. 33, No. 1, pp. 75-87 (Aug. 1986).

von Neumann, John, "Various Techniques Used in Connection With Random Digits," Applied Mathematics Series, vol. 12, United States Department of Commerce, National Bureau of Standards, pp. 36-38 (Jun. 11, 1951).

Schneier, Bruce, Applied Cryptography, John Wiley & Sons, Inc., pp. vii-xiv and 369-395 (2nd Ed., 1996).

* cited by examiner

INTEGRATED CIRCUIT CHIP HAVING FIRMWARE AND HARDWARE SECURITY PRIMITIVE DEVICE(S)

BACKGROUND OF THE INVENTION

1. Field of the Invention

The present invention relates generally to the field of computer systems. More particularly, the present invention relates to the field of security primitives for use by computer systems.

2. Description of Related Art

Computer systems typically use one or more security primitives, such as a random number generator, a monotonic counter, and/or protected storage.

Random number generators may be used for a variety of electronic applications, such as lotteries, gambling machines, video games, image processing and reconstruction, music and graphics composition, scientific and financial modeling simulation, program and algorithm testing, equation-solving, and computer security for example. For computer security applications such as cryptography, digital signatures, and protected communication protocols, for example, random numbers are a fundamental building block for strengthening and securing the confidentiality of electronic communications.

Cryptography is the art and science of keeping messages secure and involves authentication, confidentiality, and integrity.

Authentication involves ensuring each entity communicating with one another is who the other entity or entities think it is. For an exemplary authentication protocol, a client requests access over a network to password protected information stored on a server. The server responds with a random challenge, such as a random number possibly combined with other information. The client encrypts the random challenge using its password as a key and returns the encrypted challenge to the server. The server encrypts the same random challenge with the client's password which the server obtains from its own password database. The server compares the two results. If the results match, the server has authenticated the client without the client ever sending its password over the network. Random number generation is therefore critical to help ensure no unauthorized entity observing an encrypted random challenge can impersonate the client by similarly responding to new random challenges.

Confidentiality involves ensuring that no unauthorized entity listening to a communication is able to extract meaningful information. Confidentiality is typically provided through data encryption which is the process of combining the original message with a cryptographic key in a well-defined manner to encrypt the message. In an ideal cryptosystem, only an entity with a decryption key can decrypt the encrypted message. By ensuring that the decryption key cannot be predicted or replicated and that only the intended recipient of the message has the required decryption key, the message can be protected from observation by an unauthorized entity. Cryptographic keys can be symmetric or asymmetric. Symmetric keys are used for both encrypting and decrypting data. Asymmetric keys are produced in pairs, each pair consisting of a public key to encrypt data and a private key to decrypt data. The strength of a cryptosystem lies in the strength of the key which is a function of not only the number of bits in the key but also the randomness of the number used to generate the key. Random number generation is therefore critical to help ensure the confidentiality of a message.

Integrity involves ensuring no undetected changes are made to a communication. Digital signatures help maintain the integrity of a message. A digital signature is a fixed-length binary string unique to a given message and signed with a private key. The unique string is known as a message digest or cryptographic hash. Because the unique string is signed with the originator's private key, any entity with the originator's public key can decrypt the message and know the owner of the private key originated the message. By generating another hash of the message using the same hashing algorithm as the originator and comparing the new hash with the signed hash, the recipient can verify that the message did not change after leaving the originator. Random number generation is critical to the strength of a signature generated using random numbers to avoid forgery of the signature.

Monotonic counters are used to maintain a count that can only be incremented over the life of the counter. Monotonic counters help ensure, for example, a prior count or an event based on a prior count will not happen again. Monotonic counters may be used, for example, for the assignment of unique numbers or identifiers, for example, for financial accounts or commercial paper (e.g., checks).

Protected storage is used to store secret or confidential information, such as cryptographic keys, passwords, financial account identifiers, trade secrets, secure programs, etc., that may only be stored and/or retrieved in accordance with a suitable authorization scheme.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for integrated circuit chip having firmware and hardware security primitive device(s). In the following description, details are set forth such as specific circuitry configurations, etc. in order to provide a thorough understanding of the present invention. It will be evident, however, that the present invention may be practiced without these details. In other instances, well-known computer and electronic components, etc. have not been described in particular detail so as not to obscure the present invention.

Exemplary Computer System

Figure 1:
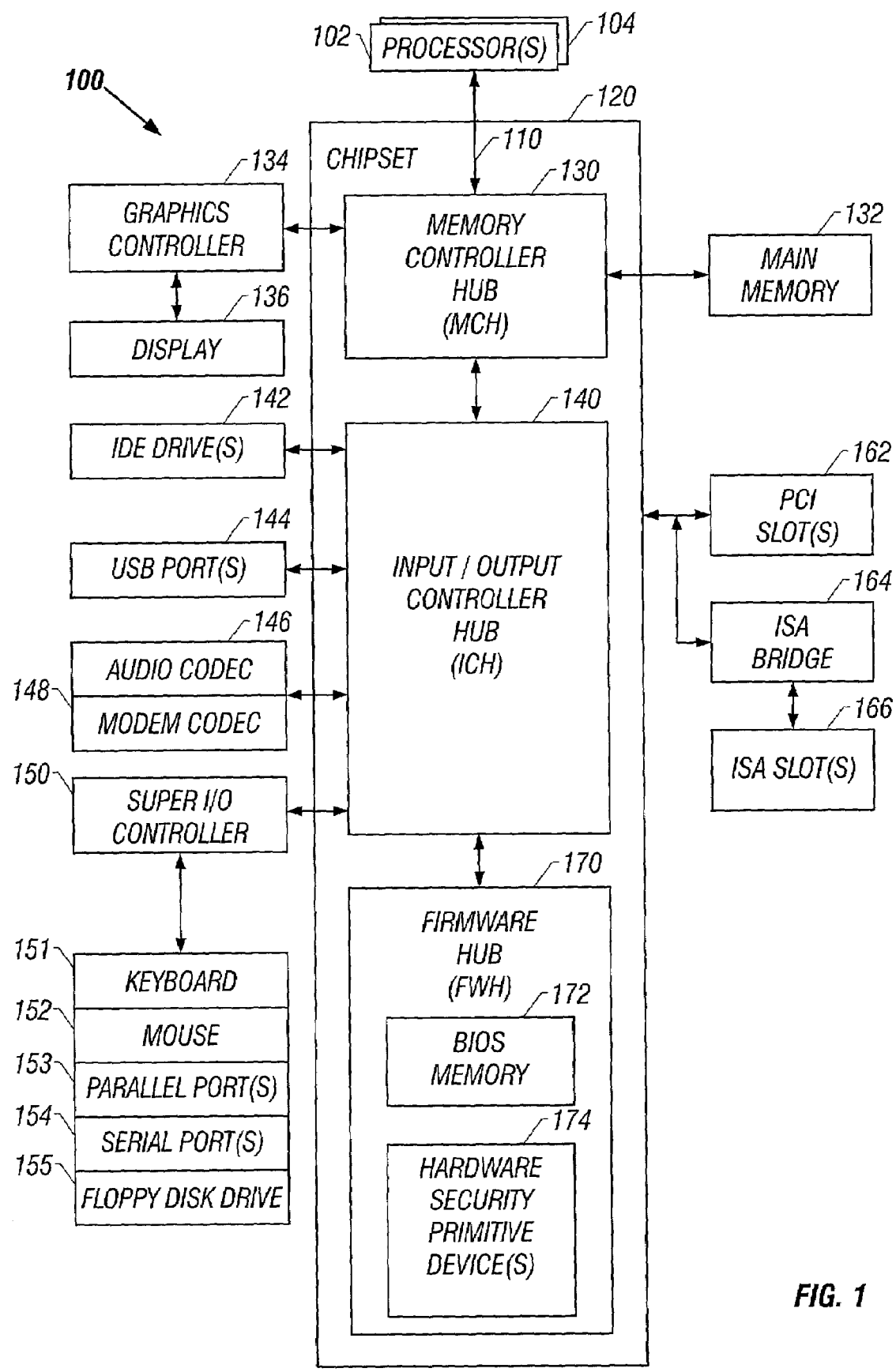
FIG. 1 illustrates an exemplary computer system comprising a firmware hub having one or more hardware security primitive devices.

FIG. 1 illustrates an exemplary computer system 100 having a firmware hub (FWH) 170 in accordance with the present invention. Although described in the context of computer system 100, the present invention may be implemented in any suitable computer system comprising any suitable one or more integrated circuits.

As illustrated in FIG. 1, computer system 100 comprises processors 102 and 104, a processor bus 110, and a chipset 120. Processors 102 and 104 and chipset 120 are coupled to processor bus 110. Processors 102 and 104 may each comprise any suitable processor such as, for example, a processor in the Pentium® or Celeron™ family of processors available from Intel® Corporation of Santa Clara, Calif. Computer system 100 for other embodiments may comprise one, three, or more processors.

Chipset 120 for one embodiment comprises a memory controller hub (MCH) 130, an input/output (I/O) controller hub (ICH) 140, and FWH 170. MCH 130, ICH 140, and FWH 170 may each comprise any suitable circuitry and for one embodiment are each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. For one embodiment where system 100 comprises only one processor 102, processor 102 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 comprises a basic input/output system (BIOS) memory 172 to store suitable system and/or video BIOS software for computer system 100. FWH 170 also comprises one or more hardware security primitive devices 174.

Firmware Hub

Figure 2:
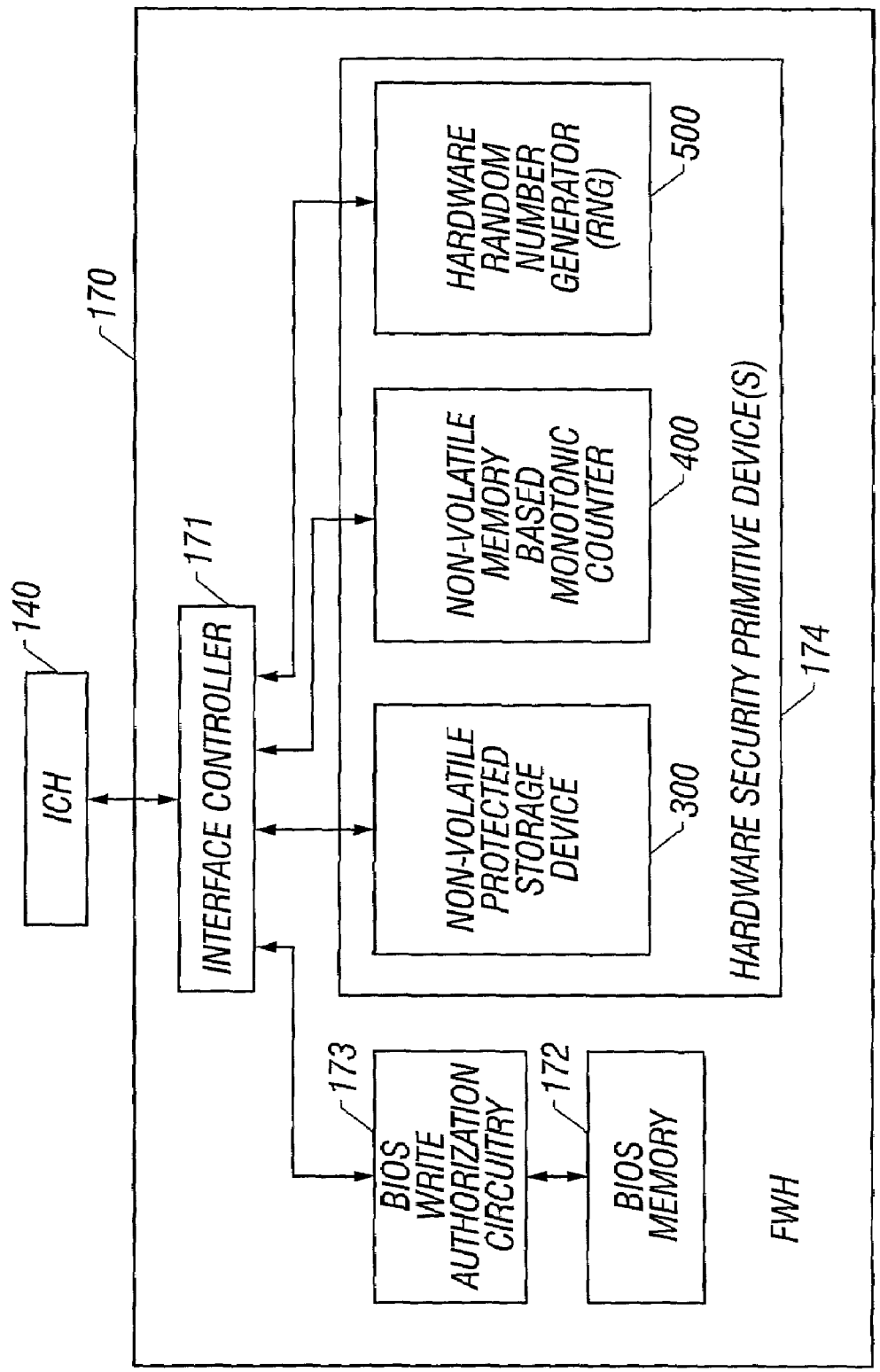
FIG. 2 illustrates, for one embodiment, a firmware hub in block diagram form.

As illustrated in FIG. 2, FWH 170 comprises an interface controller 171 to provide for a communication link to ICH 140. Interface controller 171 may comprise any suitable circuitry to interface with ICH 140 in any suitable manner. Interface controller 171 for one embodiment may share at least a portion of the interface between ICH 140 and super I/O controller 150.

BIOS memory 172 and hardware security primitive device(s) 174 are coupled to interface controller 171. Processor 102 and/or processor 104, for example, may access BIOS memory 172 and/or hardware security primitive device(s) 174 through MCH 130 and ICH 140. Processor 102 and/or processor 104 for one embodiment may execute one or more instructions of a suitable security driver stored in main memory 132, for example, to access BIOS memory 172 and/or hardware security primitive device(s) 174. Although described in connection with processor 102 and/or processor 104, any suitable integrated circuit device may access BIOS memory 172 and/or hardware security primitive device(s) 174.

Hardware security primitive device(s) 174 may comprise any suitable one or more hardware security primitive device(s), such as a non-volatile protected storage device 300, a non-volatile memory based monotonic counter 400, and/or a hardware random number generator (RNG) 500 for example.

Non-volatile protected storage device 300 stores secret or confidential information that may only be stored and/or retrieved in accordance with a suitable authorization scheme. Processor 102 and/or processor 104, for example, may use protected storage device 300 to store and retrieve any suitable secret or confidential information, such as cryptographic keys, passwords, financial account identifiers, trade secrets, secure programs, etc.

Non-volatile memory based monotonic counter 400 maintains a count or value that can only be updated by a suitable number or quantity in one direction. That is, monotonic counter 400 can only increment its value by a suitable number or decrement its value by a suitable number, but not both. Processor 102 and/or processor 104 may access the value maintained by monotonic counter 400 and use the value for any suitable purpose. Processor 102 and/or processor 104 may use monotonic counter 400, for example, to help prevent the reoccurrence of a prior count or of a prior event based on a prior count. Processor 102 and/or processor 104 may use monotonic counter 400, for example, for the assignment of unique numbers or identifiers, for example, for financial accounts or commercial paper (e.g., checks).

RNG 500 generates random bits to form random numbers, for example. Processor 102 and/or processor 104 may access and use random bits generated by RNG 500 for any suitable purpose or application, such as for lotteries, gambling machines, video games, image processing and reconstruction, music and graphics composition, scientific and financial modeling simulation, program and algorithm testing, equation-solving, and computer security applications such as cryptography, digital signatures, and protected communication protocols, for example.

BIOS

Processor 102 and/or processor 104 may access BIOS memory 172 to read and execute any BIOS software stored in BIOS memory 172. BIOS memory 172 may comprise any suitable non-volatile memory, such as flash memory for example, and may be used to store any suitable BIOS software for computer system 100. The BIOS software stored in BIOS memory 172 may comprise, for example, one or more sets of routines for computer system 100 to test computer system 100 upon startup, to prepare computer system 100 for operation, to load an operating system for computer system 100 from a hard disk, CD ROM, floppy disk or any other suitable memory device into main memory 132 and pass execution to the operating system, and/or to support I/O or peripheral technologies and internal services for computer system 100.

For one embodiment where BIOS memory 172 comprises a rewritable non-volatile memory, such as flash memory for example, FWH 170 comprises optional BIOS write authorization circuitry 173 coupled between interface controller 171 and BIOS memory 172 to provide for secure write access to BIOS memory 172. BIOS write authorization circuitry 173 helps ensure any device, such as processor 102 or processor 104 for example, attempting to write to BIOS memory 172 is authorized to do so. In this manner, BIOS software may only be added to, updated, or deleted from BIOS memory 172 with no or minimized concern for intrusive attacks to computer system 100 due to the unauthorized corruption of BIOS software. BIOS write authorization circuitry 173 may comprise any suitable circuitry to provide secure write access to BIOS memory 172 in any suitable manner.

Non-Volatile Protected Storage Device

Non-volatile protected storage device 300 stores secret or confidential information for computer system 100. Protected storage device 300 may comprise any suitable circuitry to allow information to be stored and/or retrieved in accordance with any suitable authorization scheme.

Figure 3:
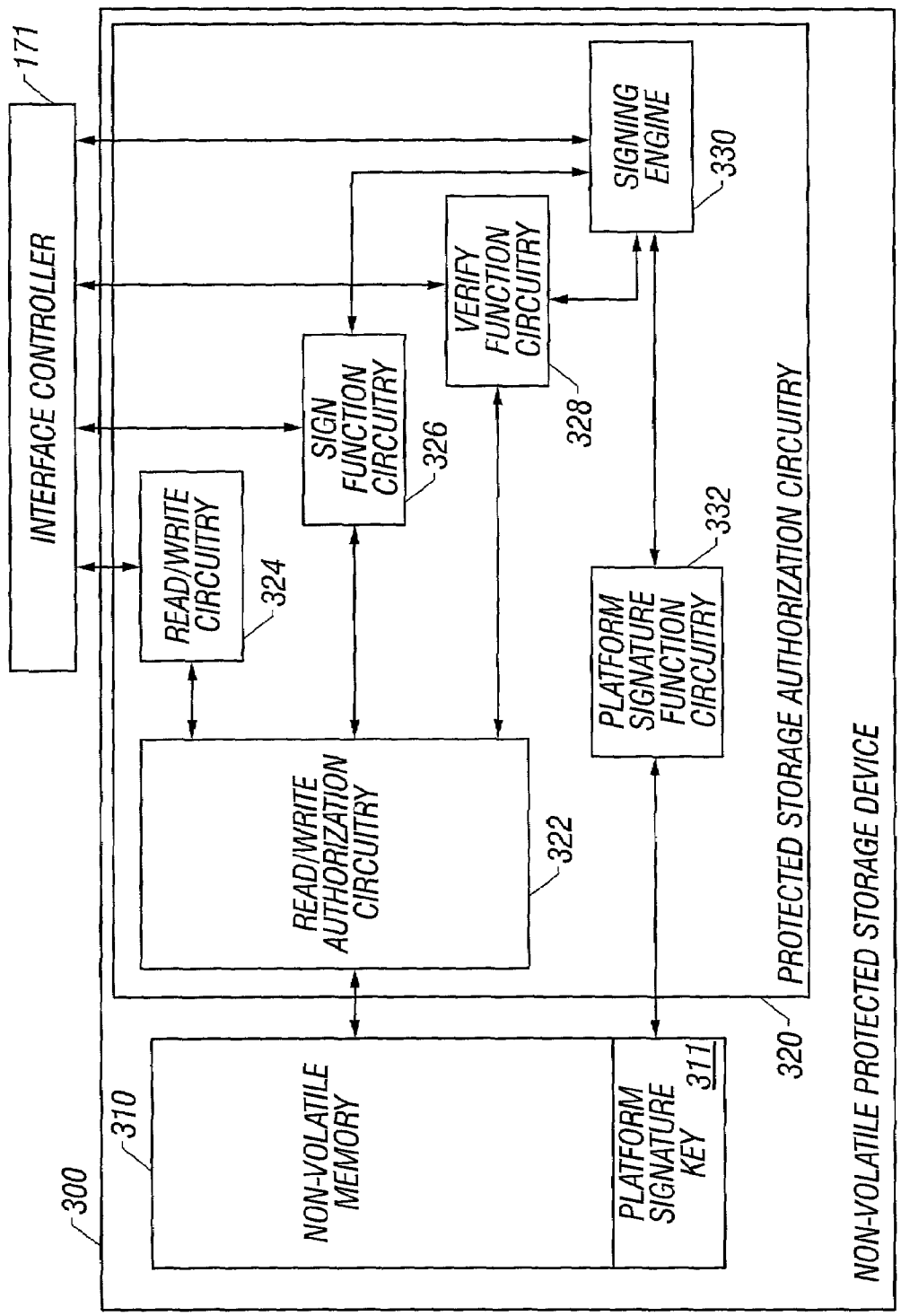
FIG. 3 illustrates, for one embodiment, circuitry for a non-volatile protected storage device.

Protected storage device 300 for one embodiment, as illustrated in FIG. 3, comprises non-volatile memory 310 and protected storage authorization circuitry 320 coupled between interface controller 171 and non-volatile memory 310. Non-volatile memory 310 may comprise any suitable non-volatile memory, such as flash memory for example. Non-volatile memory 310 for one embodiment comprises an optional dedicated portion 311 to store a platform signature key. The platform signature key may comprise any suitable number of bits. Protected storage authorization circuitry 320 provides secure access to non-volatile memory 310. Protected storage authorization circuitry 320 helps ensure any device, such as processor 102 or processor 104 for example, attempting to read from or write to non-volatile memory 310 is authorized to do so.

Protected storage authorization circuitry 320 may comprise any suitable circuitry to provide secure access to non-volatile memory 310 in any suitable manner. Protected storage authorization circuitry 320 for one embodiment, as illustrated in FIG. 3, comprises read/write authorization circuitry 322, read/write circuitry 324, sign function circuitry 326, verify function circuitry 328, signing engine 330, and platform signature function circuitry 332.

Read/write authorization circuitry 322 is coupled to non-volatile memory 310. Read/write circuitry 324, sign function circuitry 326, and verify function circuitry 328 are each coupled between read/write authorization circuitry 322 and interface controller 171. Signing engine 330 is coupled to interface controller 171, sign function circuitry 326, and verify function circuitry 328.

Read/write authorization circuitry 322 authorizes read and/or write access to non-volatile memory 310. Read/write circuitry 324 controls authorized read and write access to non-volatile memory 310. Sign function circuitry 326 may perform any suitable sign function using any suitable algorithm and key to sign or encrypt information to produce a signature. Verify function circuitry 328 may perform any suitable verify function using any suitable algorithm and key to decrypt a signature. Signing engine 330 controls sign function circuitry 326 and verify function circuitry 328 to authenticate the identity of any entity attempting to access non-volatile memory 310 and/or to verify the integrity of a communication. Read/write authorization circuitry 322 and signing engine 330 may use sign function circuitry 326 and/or verify function circuitry 328 in accordance with any suitable algorithm or protocol.

Signing engine 330 may optionally control platform signature function circuitry 332 coupled between signing engine 330 and dedicated portion 311. Platform signature function circuitry 332 signs at least a portion of the platform signature key stored in dedicated portion 311. Platform signature function circuitry 332 may perform any suitable sign function using any suitable algorithm and key to sign the platform signature key. The platform signature key for one embodiment may be set by the manufacturer of FWH 170 and used to enable communication with other entities manufactured by the same manufacturer. Signing engine 330 may use platform signature function circuitry 332 in accordance with any suitable algorithm or protocol.

Monotonic Counter

Monotonic counter 400 maintains for computer system 100 a count or value that can only be updated by a suitable number or quantity in one direction. Monotonic counter 400 may comprise any suitable circuitry to maintain a count or value of any suitable size.

Monotonic counter 400 may maintain the value from any suitable minimum value up to any suitable maximum value or from any suitable maximum value down to any suitable minimum value. Monotonic counter 400 may update its value by any suitable number in one direction in accordance with any suitable technique. For one embodiment, monotonic counter 400 updates its value by a suitable number in the one direction when the value for monotonic counter 400 is read by processor 102, for example. By updating its value each time the value is read, monotonic counter 400 helps ensure the same value is not read more than once.

Monotonic counter 400 comprises non-volatile memory to help ensure the same value is not read more than once despite the deactivation or loss of power to monotonic counter 400. Monotonic counter 400 may store in such non-volatile memory any suitable information on which monotonic counter 400 may at least partially base its value. Monotonic counter 400 may at least partially base its value on the content of such non-volatile memory in any suitable manner. In the event power to monotonic counter 400 is lost or deactivated after its value is read but before it is updated, monotonic counter 400 for one embodiment may also update its value by a suitable number when monotonic counter 400 is powered on. Monotonic counter 400 may be powered on, for example, when computer system 100 is powered on.

Figure 4:
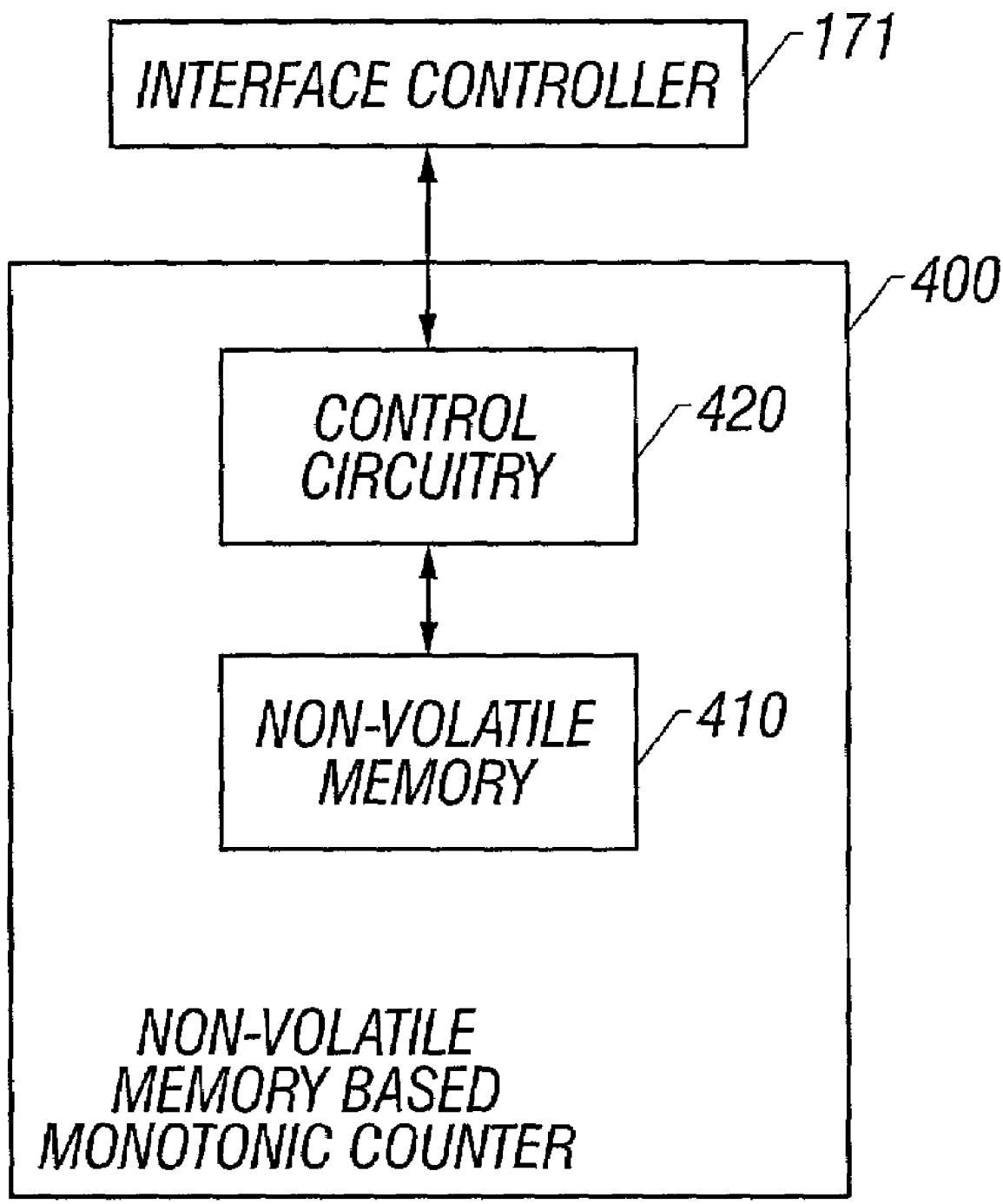
FIG. 4 illustrates, for one embodiment, circuitry for a non-volatile memory based monotonic counter.

As illustrated in FIG. 4, monotonic counter 400 for one embodiment comprises non-volatile memory 410 and control circuitry 420 coupled between non-volatile memory 410 and interface controller 171. Control circuitry 420 maintains a count or value at least partially based on the content of non-volatile memory 410. Control circuitry 420 also provides read access to the value for monotonic counter 400 for processor 102, for example. Control circuitry 420 may store in non-volatile memory 410 any suitable information on which control circuitry 420 may at least partially base its value. Control circuitry 420 for one embodiment may store the current value of monotonic counter 400 in non-volatile memory 410. Non-volatile memory 410 may comprise any suitable non-volatile memory, such as flash memory for example.

Prior to any use of monotonic counter 400, non-volatile memory 410 may be set with suitable information corresponding to a suitable initial minimum value, such as zero for example, where monotonic counter 400 increases its value or to a suitable maximum value where monotonic counter 400 decreases its value.

Control circuitry 420 may comprise any suitable circuitry to maintain a count or value in any suitable manner. Control circuitry 420 may update the value for monotonic counter 400 by any suitable number, such as one for example, in accordance with any suitable technique. Control circuitry 420 may update the value, for example, when the value is read by processor 102, for example, and/or when monotonic counter 400 is powered on. Control circuitry 420 for one embodiment helps ensure the same value for monotonic counter 400 is not read more than once by disabling read access to the value for monotonic counter 400 while the value for monotonic counter 400 is updated.

When updating the value for monotonic counter 400 equals or exceeds a predetermined maximum number where monotonic counter 400 increases its value or a predetermined minimum value where monotonic counter 400 decreases its value, control circuitry 420 for one embodiment disables monotonic counter 400. Control circuitry 420 may disable monotonic counter 400 in any suitable manner, such as by disabling access to monotonic counter 400 or by locking the value for monotonic counter 400 at a predetermined value, such as zero for example.

The value for monotonic counter 400 may be read from monotonic counter 400 in any suitable manner. Processor 102, for example, may read the value from monotonic counter 400 for any suitable purpose.

Hardware Random Number Generator

RNG 500 generates and enables access to one or more random bits for computer system 100. RNG 500 may comprise any suitable circuitry to generate and enable access to random bits.

Figure 5:
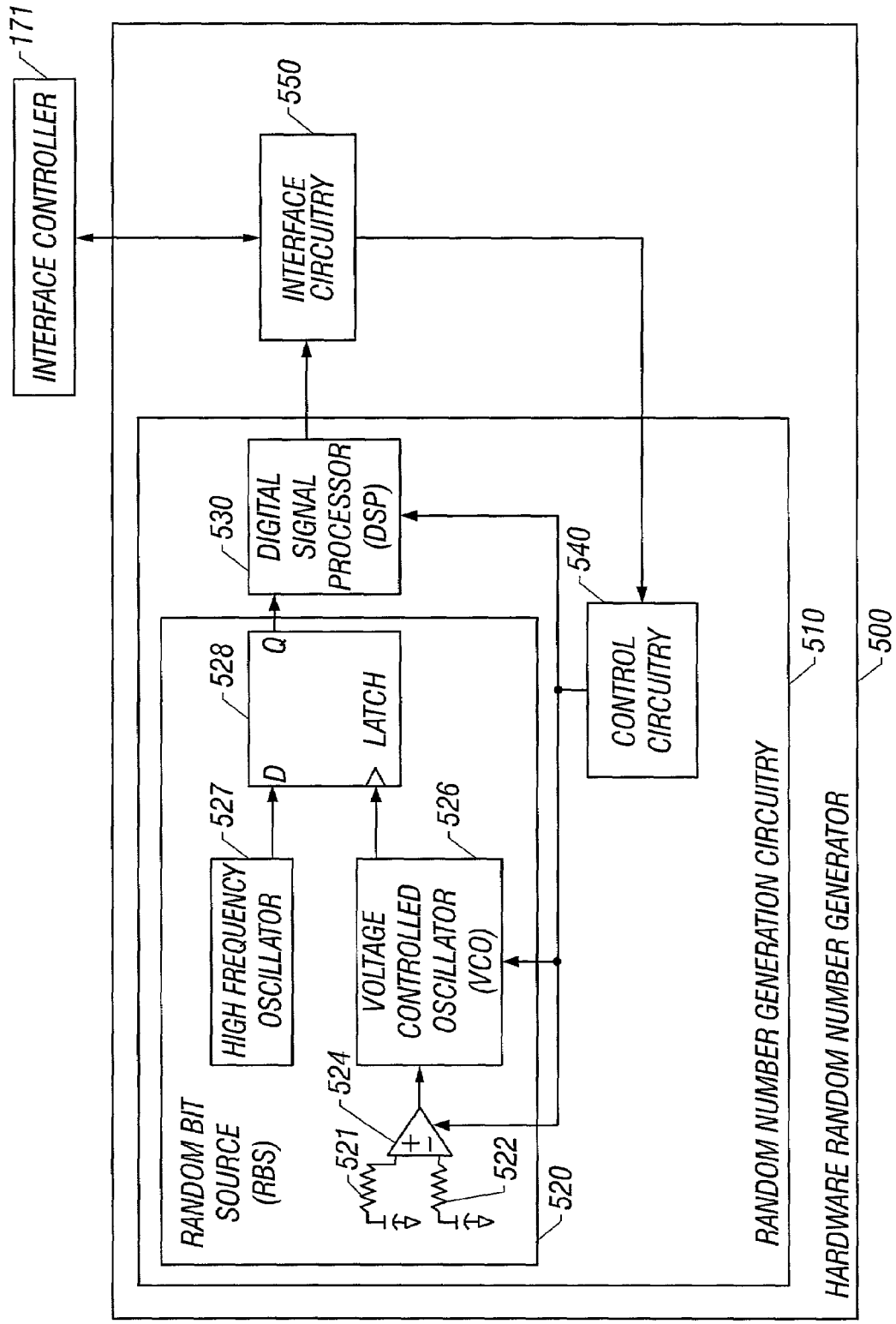
FIG. 5 illustrates, for one embodiment, circuitry for a hardware random number generator.

RNG 500 for one embodiment comprises random number generation circuitry 510 and interface circuitry 550 as illustrated in FIG. 5. Random number generation circuitry 510 generates and outputs random bits to interface circuitry 550. Interface circuitry 550 is coupled between random number generation circuitry 510 and interface controller 171 and controls access to random bits output from random number generation circuitry 510.

Random number generation circuitry 510 may comprise any suitable circuitry to generate and output random bits. As illustrated in FIG. 5, random number generation circuitry 510 for one embodiment comprises a random bit source (RBS) 520, a digital signal processor (DSP) 530, and control circuitry 540 as illustrated in FIG. 5. RBS 520 generates and outputs random bits to DSP 530, and DSP 530 processes the random bits output from RBS 520 to generate and output processed random bits to interface circuitry 550. RBS 520 and DSP 530 generate and output random bits under control of control circuitry 540.

RBS 520 may comprise any suitable circuitry, including suitable analog and/or suitable digital circuitry, and/or any suitable one or more devices to generate and output random bits using any suitable random source, such as semiconductor junction or thermal noise for example. As illustrated in FIG. 5, RBS 520 for one embodiment comprises resistors 521 and 522, a differential amplifier 524, a relatively low frequency voltage controlled oscillator (VCO) 526, a relatively high frequency oscillator 527, and a D-type latch 528.

High frequency oscillator 527 generates and outputs a relatively high frequency digital oscillating signal at an output coupled to a D input terminal of D-type latch 528. High frequency oscillator 527 may operate at any suitable nominal frequency. VCO 526 generates and outputs a relatively low frequency digital oscillating signal at an output coupled to a clock input terminal of D-type latch 528. VCO 526 may operate at any suitable nominal frequency. D-type latch 528 samples the signal generated by high frequency oscillator 527 at a frequency determined by VCO 526 to generate and output a sequence of bit signals or bits at a Q output terminal of D-type latch 528.

The frequency of operation of VCO 526 is controlled by a voltage signal generated and output by differential amplifier 524. The voltage signal is developed from noise from resistors 521 and 522. Resistors 521 and 522 for one embodiment are each fabricated from an n-well in silicon and therefore generate noise due to the inherently random quantum mechanical properties of silicon. Resistors 521 and 522 for one embodiment have approximately the same value of resistance.

Resistor 521 is coupled between a non-inverting input terminal of differential amplifier 524 and a ground terminal. A capacitor is coupled in series between resistor 521 and the ground terminal. Resistor 522 is coupled between an inverting input terminal of differential amplifier 524 and a ground terminal. A capacitor is coupled in series between resistor 522 and the ground terminal. Differential amplifier 524 applies a suitable current through each resistor 521 and 522, incurring a voltage across each resistor 521 and 522. Differential amplifier 524 amplifies the difference in voltage at its input terminals to generate and output the voltage signal at an output coupled to an input terminal of VCO 526. Because this voltage difference varies based on the noise generated within each resistor 521 and 522, VCO 526 generates and outputs a digital oscillating signal at a random frequency. The bits output by D-type latch 528 are therefore random.

The Q output terminal of D-type latch 528 is coupled to an input terminal of DSP 530. DSP 530 processes the sequence of random bits output from D-type latch 528 to generate and output processed random bits to interface circuitry 550. DSP 530 may comprise any suitable circuitry to process random bits generated and output by RBS 520 in any suitable manner. DSP 530 for one embodiment processes random bits to accumulate entropy or randomness in the random bits output from RBS 520. DSP 530 for one embodiment comprises a linear feedback shift register (LFSR) configured to accumulate entropy in the random bits output from RBS 520.

Control circuitry 540 is coupled to RBS 520 and DSP 530 and controls the generation and output of random bits by RBS 520 and DSP 530. Control circuitry 540 may comprise any suitable circuitry to control the generation and output of random bits by RBS 520 and DSP 530 in any suitable manner. Control circuitry 540 for one embodiment selectively enables and disables RBS 520 and DSP 530 to generate and output random bits only as desired or needed to help minimize power consumption by random number generation circuitry 510.

As illustrated in FIG. 5, control circuitry 540 for one embodiment selectively generates and outputs an enable signal to differential amplifier 524 to enable and disable the generation and output of voltage signals by differential amplifier 524. Control circuitry 540 for one embodiment also selectively generates and outputs an enable signal to VCO 526 to enable and disable the generation and output of oscillating signals by VCO 526. Control circuitry 540 for one embodiment further selectively generates and outputs an enable signal to DSP 530 to enable and disable the generation and output of processed random bits by DSP 530.

Interface circuitry 550 is coupled to random number generation circuitry 510 and receives and stores random bits from random number generation circuitry 510. Interface circuitry 550 provides an interface to enable access to random bits. Interface circuitry 550 may comprise any suitable circuitry to receive and store random bits from random number generation circuitry 510 and to provide an interface to enable access to random bits.

Control circuitry 540 for one embodiment is coupled to interface circuitry 550 and interfaces with interface circuitry 550 to help control the generation and reading of random bits from RNG 500.

Interface circuitry 550 for one embodiment signals to control circuitry 540 to disable RBS 520 and DSP 530 to help minimize power consumption by random number generation circuitry 510 when interface circuitry 550 has stored a suitable predetermined number of unread random bits, such as the maximum number of random bits that may be stored by interface circuitry 550 for example. As or when unread random bits stored by interface circuitry 550 are output, interface circuitry 550 may signal control circuitry 540 to enable random number generation circuitry 510 to generate and output more random bits.

Random bits may be read from RNG 500 in any suitable manner. Processor 102, for example, may read random bits from RNG 500 any suitable number of times for any suitable purpose. Processor 102 for one embodiment may combine the random bits read from RNG 500 to form a random number of any suitable size, such as 32-bits, 40-bits, 56-bits, 64-bits or 128-bits for example, for use for cryptography, digital signatures, and protected communication protocols, for example.

Random number generation circuitry 510 is implemented in hardware and is therefore inherently less prone to security violations as compared to software implemented random number generators. Also, for embodiments where random number generation circuitry 510 uses noise in a semiconductor junction, such as in a resistor or diode for example, random number generation circuitry 510 generates random bits with relatively more randomness as random number generation circuitry 510, unlike typical software implemented random number generators, generates random bits that do not rely on predictable data collected from the computer system, that do not eventually repeat in a predictable manner, and that are not susceptible to intrusion or exposure by algorithm disassembly or disclosure.

Integration of Hardware Security Primitive Devices

Integrating hardware security primitive devices 174 on the same chip helps provide a platform that is convenient for adding tamper hardened security primitive devices to a chipset or computer system, for example. Because BIOS memory 172, protected storage device 300, and/or monotonic counter 400 for one embodiment comprise flash memory and because RNG 500 for one embodiment uses properties native to silicon circuitry as a source of randomness and also uses analog circuitry, RNG 500 is integrated with BIOS memory 172, protected storage device 300, and/or monotonic counter 400, noting analog circuitry fits relatively well within the well-characterized flash process and the unpredictable behavior of RNG 500 works relatively well with a flash-based tester as compared to a vector logic tester.

Although described in connection with FWH 170 comprising BIOS memory 172 and hardware security primitive device(s) 174, any suitable integrated circuit chip having any suitable firmware and any suitable one or more hardware security primitive devices may be used.

Another Exemplary Computer System

Figure 6:
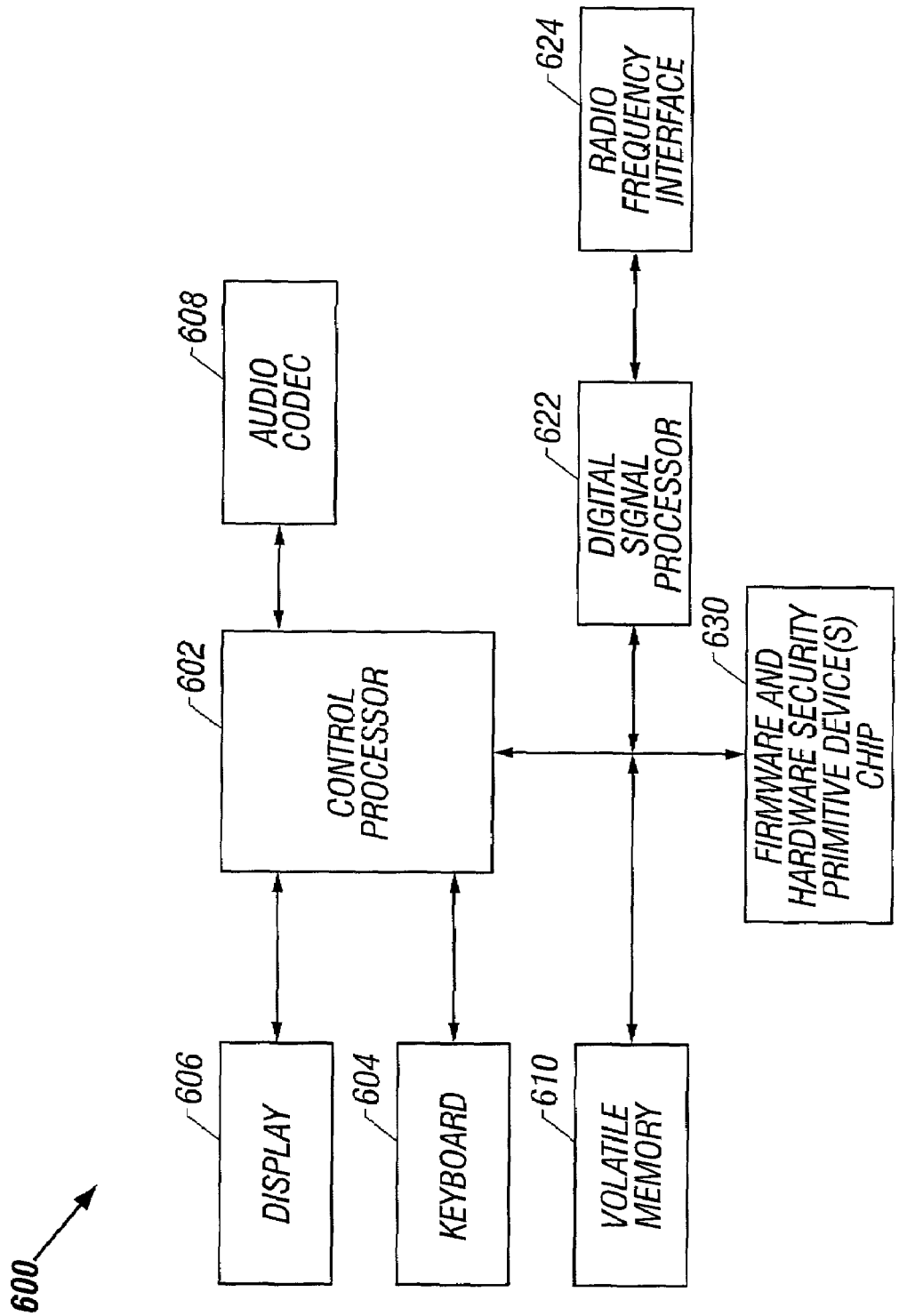
FIG. 6 illustrates, for one embodiment, another exemplary computer system comprising an integrated circuit chip having firmware and one or more hardware security primitive devices.

FIG. 6 illustrates an exemplary computer system 600 comprising a control processor 602, a keyboard 604, a display 606, an audio coder/decoder (codec) 608, a volatile memory 610, a digital signal processor (DSP) 622, a radio frequency (RF) interface 624, and a firmware and hardware security primitive device(s) chip 630. Computer system 600 may be used for any suitable handheld and/or wireless device such as, for example, a cellular telephone or a personal digital assistant (PDA). Computer system 600 for other embodiments may comprise any other suitable combination of any suitable components.

Keyboard 604, display 606, and audio codec 608 are each coupled to control processor 602. Audio codec 608 may be used, for example, to couple a microphone, speakers, and/or headphones, for example, to control processor 602. Volatile memory 610 is coupled to control processor 602 and to DSP 622 and serves as a working memory for control processor 602 and/or DSP 622. DSP 622 is coupled to control processor 602 and to RF interface 624. RF interface 624 transmits and receives RF signals for computer system 600. DSP 622 performs suitable digital signal processing techniques for signals received by RF interface 624 and for signals to be transmitted through RF interface 624.

Chip 630 is coupled to control processor 602 and to DSP 622. Chip 630 comprises firmware and one or more hardware security primitive devices similarly as FWH 170. Chip 630 for one embodiment comprises non-volatile memory to store firmware for execution by control processor 602 and/or DSP 622. The non-volatile memory of chip 630 may be used to store any suitable firmware, such as operating system software for example, for computer system 600. The non-volatile memory of chip 630 may also be used to store data, such as phone directory information for example, for computer system 600. Any suitable non-volatile memory, such as flash memory for example, may be used.

Chip 630 may comprise any suitable one or more hardware security primitive device(s), such as non-volatile protected storage device 300, non-volatile memory based monotonic counter 400, and/or hardware random number generator (RNG) 500 for example. Non-volatile protected storage device 300 may be used for handheld and/or wireless devices, for example, to store information, such as a device identification number and/or an account number for example, to help protect communication service providers from fraud. Non-volatile protected storage device 300 may also be used for handheld and/or wireless devices, for example, to store personal information for one or more users of each device. Such personal information may include, for example, credit card numbers, calling card numbers, passwords, home entry and/or alarm access codes, car entry and/or alarm access codes, and any suitable information that may be used for mobile commerce.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. An integrated circuit comprising:
   firmware non-volatile memory to store firmware;
   at least one hardware security primitive device comprising non-volatile memory having a non-volatile memory based monotonic counter to update a count each time a count value is read and to prevent each count value from being read more than one time; and
   a hardware random number generator to generate and output random bits.

2. The integrated circuit of claim 1, the firmware non-volatile memory to store basic input/output system (BIOS) software.

3. The integrated circuit of claim 1, wherein the firmware non-volatile memory comprises flash memory.

4. The integrated circuit of claim 1, wherein the at least one hardware security primitive device comprises a protected storage device.

5. The integrated circuit of claim 1, wherein the non-volatile memory of the at least one hardware security primitive device comprises flash memory.

6. The integrated circuit of claim 1, the hardware random number generator to generate random bits based on semiconductor junction or thermal noise.

7. A chipset comprising:
   a memory controller hub;
   an input/output controller hub; and
   a firmware hub comprising:
      firmware non-volatile memory to store firmware,
      at least one hardware security primitive device comprising non-volatile memory having a non-volatile memory based monotonic counter to update a count each time a count value is read and to prevent each count value from being read more than one time; and
      a hardware random number generator, integrated on the same integrated circuit as the firmware non-volatile memory and the at least one hardware security primitive device, to generate and output random bits.

8. The chipset of claim 7, the firmware non-volatile memory to store basic input/output system (BIOS) software.

9. The chipset of claim 7, wherein the firmware non-volatile memory comprises flash memory.

10. The chipset of claim 7, wherein the at least one hardware security primitive device comprises a protected storage device.

11. The chipset of claim 7, wherein the non-volatile memory of the at least one hardware security primitive device comprises flash memory.

12. The chipset of claim 7, the hardware random number generator to generate random bits based on semiconductor junction or thermal noise.

13. A computer system comprising:
   one or more processors;
   a memory controller hub;
   an input/output controller hub; and
   a firmware hub comprising:
      firmware non-volatile memory to store firmware,
      at least one hardware security primitive device comprising non-volatile memory having a non-volatile memory based monotonic counter to update a count each time a count value is read and to prevent each count value from being read more than one time; and
      a hardware random number generator, integrated on the same integrated circuit as the firmware non-volatile memory and the at least one hardware security primitive device, to generate and output random bits.

14. The computer system of claim 13, the firmware non-volatile memory to store basic input/output system (BIOS) software.

15. The computer system of claim 13, wherein the firmware non-volatile memory comprises flash memory.

16. The computer system of claim 13, wherein the at least one hardware security primitive device comprises a protected storage device.

17. The computer system of claim 13, wherein the non-volatile memory of the at least one hardware security primitive device comprises flash memory.

18. The computer system of claim 13, wherein the hardware random number generator generates random bits based on semiconductor junction or thermal noise.

19. A computer system comprising:
   a control processor;
   a digital signal processor; and
   an integrated circuit chip comprising:
      firmware non-volatile memory to store firmware, and
      at least one hardware security primitive device comprising non-volatile memory having a non-volatile memory based monotonic counter to update a count each time a count value is read and to prevent each count value from being read more than one time; and
      a hardware random number generator, integrated on the same integrated circuit as the firmware non-volatile memory and the at least one hardware security primitive device, to generate and output random bits.

20. The computer system of claim 19, wherein the firmware non-volatile memory stores operating system software.

21. The computer system of claim 19, wherein the firmware non-volatile memory comprises flash memory.

22. The computer system of claim 19, wherein the at least one hardware security primitive device comprises a protected storage device.

23. The computer system of claim 19, wherein the non-volatile memory of the at least one hardware security primitive device comprises flash memory.

24. The computer system of claim 19, wherein the hardware random number generator generates random bits based on semiconductor junction or thermal noise.

* * * * *